United States Patent [19]

Kawagishi et al.

[11] Patent Number: 5,082,352
[45] Date of Patent: Jan. 21, 1992

[54] FERROELECTRIC LIQUID CRYSTAL APPARATUS

[75] Inventors: Hideyuki Kawagishi, Fujisawa; Hirofumi Iwamoto, Hiratsuka; Yoshihiro Onitsuka, Yokohama, all of Japan

[73] Assignee: Canon Kabushiki Kaisha, Tokyo, Japan

[21] Appl. No.: 413,232

[22] Filed: Sep. 27, 1989

[30] Foreign Application Priority Data

Sep. 29, 1988 [JP] Japan .................. 63-242573
Sep. 29, 1988 [JP] Japan .................. 63-242574
Sep. 29, 1988 [JP] Japan .................. 63-242575
Sep. 29, 1988 [JP] Japan .................. 63-242576

[51] Int. Cl.$^5$ ............................................. G02F 1/13
[52] U.S. Cl. ......................................... 359/63; 359/78
[58] Field of Search ............ 350/337, 340, 341, 350 S, 350/347 E

[56] References Cited

U.S. PATENT DOCUMENTS

| | | | |
|---|---|---|---|
| 4,586,791 | 5/1986 | Isogai et al. | 350/341 |
| 4,634,228 | 1/1987 | Iwasaki et al. | 350/341 |
| 4,693,562 | 9/1987 | Hasegawa et al. | 350/341 |
| 4,709,994 | 12/1987 | Kanbe et al. | 350/350 S |
| 4,838,663 | 6/1989 | Lagerwall et al. | 350/350 S |
| 4,879,059 | 11/1989 | Hanyu et al. | 350/341 |
| 4,932,758 | 6/1990 | Hanyu et al. | 350/350 S |

OTHER PUBLICATIONS

Molecular Crystals and Liquid Crystals, vol. 152, Part B, pp. 631-650, Nov. 1987.
IEEE Spectrum, vol. 22, No. 7, pp. 52-59, Jul. 1985.

*Primary Examiner*—Rolf Hille
*Assistant Examiner*—Tan Ho
*Attorney, Agent, or Firm*—Fitzpatrick, Cella, Harper & Scinto

[57] ABSTRACT

A ferroelectric liquid crystal apparatus includes: a ferroelectric liquid crystal cell including a pair of substrates each having an electrode and an alignment film thereon, the alignment films being respectively provided with uniaxial orientation axes (preferably those provided by rugging) which are provided in parallel and in the same oblique direction of from upper right to lower left or from lower left to upper right [from lower right to upper left or from upper left to lower right], a first polarizer having a transmission axis set within a region (I) defined by a clockwise (or counterclockwise) angle of 45° from the direction of the uniaxial orientation axes, a second polarizer having a transmission axis set within a region (II) defined by a clockwise (or counter-clockwise) angle of 45° from the direction forming right angles with the direction of the unilaxial orientation axes, and a mechanism for adjusting an angle of the ferroelectric liquid crystal cell standing up from a horizontal plane.

16 Claims, 9 Drawing Sheets

FERROELECTRIC LIQUID CRYSTAL APPARATUS

FIELD OF THE INVENTION AND RELATED ART

The present invention relates to a liquid crystal apparatus using a ferroelectric liquid crystal, particularly a ferroelectric liquid crystal display apparatus with suppressed color irregularity.

Clark and Lagerwall have disclosed a surface-stabilized bistable ferroelectric liquid crystal in Applied Physics Letters, Vol. 36, No. 11 (June 1, 1980), p.p. 899–901, and U.S. Pat. Nos. 4,367,924 and 4,563,059. The bistable ferroelectric liquid crystal has been realized by disposing a chiral smectic liquid crystal between a pair of substrates which are set to provide a spacing small enough to suppress the formation of a helical arrangement of liquid crystal molecules inherent to the bulk chiral smectic phase of the liquid crystal and aligning vertical molecular layers each composed of a plurality of liquid crystal molecules in one direction. Such a chiral smectic liquid crystal is expected to be used for constituting a display panel.

In such a ferroelectric liquid crystal display apparatus, in case where rubbing is applied to the display panel horizontally or vertically, there has been observed a problem of color irregularity at the time of head shaking that the display image remarkably changes its white display state from yellowish white to bluish white when the display user shakes his head right and left because of a viewing angle characteristic arising from the alignment state.

In contrast case where the rubbing is applied in an oblique direction with respect to the display panel, the color irregularity accompanying head shaking is suppressed. In this case, however, when the display user faces a bluish white state, there is observed a so-called negative-positive inversion that a black state and a white state are substituted for each other at viewing angles of 45 degrees or larger from the right opposite in the vertical direction, thus resulting in a remarkably degraded display quality. Further, in case where the display user faces a yellowish white state, the contrast in the vertical direction remarkably decreases from its maximum in the vicinity of the opposite direction so that there can result in a low contrast display depending on a change in viewing angle position due to a change in sitting height of the display user. Further, in case where the display user faces a yellowish white state, the contrast in the horizontal direction is uniformly high and easy to see within a viewing angle region of about ±30 degrees from the opposite, but a so-called negative-positive inversion that a black state and a white state are substituted for each other is observed at a horizontal viewing angle of about 45 degrees or larger to result in a remarkably degraded display quality.

SUMMARY OF THE INVENTION

An object of the present invention is to provide a ferroelectric liquid crystal apparatus having solved the above problems, particularly preventing the color irregularity accompanying head shaking and also preventing occurrence of a negative-positive inversion region on the display user side to provide an improved display quality as a whole.

Another object of the present invention is to provide a ferroelectric liquid crystal apparatus preventing the lowering in contrast depending on the viewing angle position of the display user in the vertical direction and also providing a sufficiently wide- viewing angle region in the horizontal direction free from the negative-positive inversion to provide an improved display quality as a whole.

According to a first aspect of the present invention, there is provided a ferroelectric liquid crystal apparatus, comprising:

a ferroelectric liquid crystal cell including a pair of substrates each having an electrode and an alignment film thereon, the alignment films being respectively provided with uniaxial orientation axes (preferably those provided by rubbing) which are provided in parallel and in the same oblique direction of from upper right to lower left or from lower left to upper right;

a first polarizer having a transmission axis set within a region (I) defined by a clockwise (or counterclockwise) angle of 45 degrees from the direction of the uniaxial orientation axes;

a second polarizer having a transmission axis set within a region (II) defined by a clockwise (or counterclockwise) angle of 45 degrees from the direction forming right angles with the direction of the uniaxial orientation axes; and a mechanism for adjusting an angle of the ferroelectric liquid crystal cell standing up from a horizontal plane.

According to a second aspect of the present invention, there is provided a ferroelectric liquid crystal apparatus, comprising:

a ferroelectric liquid crystal cell including a pair of substrates each having an electrode and an alignment film thereon, the alignment films being respectively provided with uniaxial orientation axes which are provided in parallel and in the same oblique direction of from lower right to upper left or from upper left to lower right;

a first polarizer having a transmission axis set within a region (I) defined by a clockwise (or counterclockwise) angle of 45 degrees from the direction of the uniaxial orientation axes;

a second polarizer having a transmission axis set within a region (II) defined by a clockwise (or counterclockwise) angle of 45 degrees from the direction forming right angles with the direction of the uniaxial orientation axes; and a mechanism for adjusting an angle of the ferroelectric liquid crystal cell standing up from a horizontal plane.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 2A:
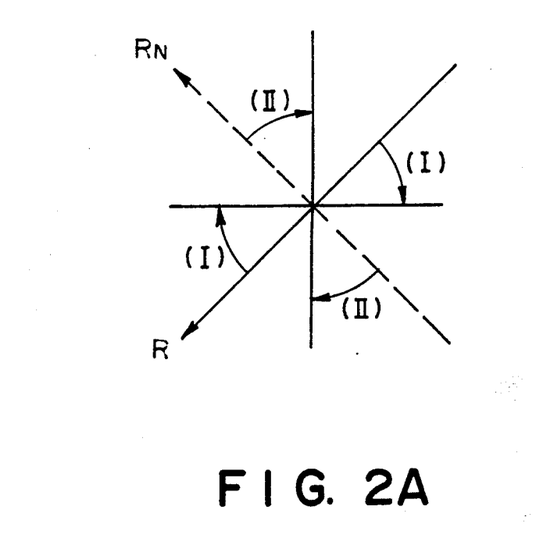
FIGS. 2A–2D are explanatory views for illustrating regions (I) and (II) in relation to the rubbing direction in the present invention.
Figure 2B:
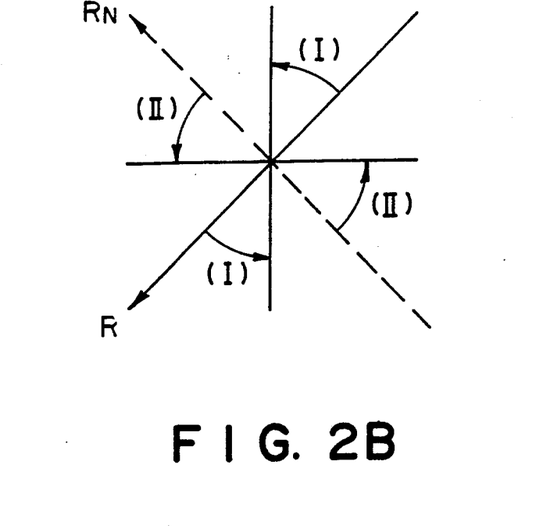

FIGS. 2A and 2B each show a relationship between regions (I) and (II) and a rubbing direction in case where a pair of substrates have alignment films provided with rubbing axes which are parallel with each other and in the same oblique direction extending from upper right to lower left (or lower left to upper right). In these figures, R denotes the rubbing direction, $R_N$ denotes the direction intersecting perpendicularly to the rubbing direction, (I) denotes a region (I) and (II) denotes a region (II). FIG. 2A shows an embodiment wherein the region (I) is set as a region defined by a clockwise angle of 45 degrees from the rubbing direction R, and FIG. 2B shows an embodiment wherein the region (I) is set as a region defined by a counterclockwise angle of 45 degrees from the rubbing direction R.

According to the embodiment shown in FIG. 2A, the rubbing is applied in an oblique direction of from upper right to lower left or from lower left to upper right. As a result, in a viewing angle region of about 30 degrees from the panel opposite, a region where a white display state abruptly changes from a yellowish white to a bluish white is deviated to the oblique direction, whereby the color irregularity accompanying head shaking is suppressed.

Further, in the embodiment shown in FIG. 2A, the transmission axis of a first polarizer is set within the region (I) defined by a clockwise angle of 0-45 degrees from the oblique rubbing direction R, and the transmission axis of a second polarizer is set within a region (II) defined by a clockwise angle of 0-45 degrees from the direction intersecting perpendicularly to the oblique rubbing direction. As a result, the white display state is so controlled that the display user always faces a bluish white and the occurrence of a negative-positive inversion region is prevented with respect to a horizontal viewing angle characteristic.

By setting the rubbing direction and the transmission axis directions of the polarizers in the above-described manner, a problem of a negativepositive inversion of an exchange between black and white states occurs according to a change in viewing angle in the vertical direction. However, as the apparatus is constructed so as to allow adjustment of the disposition angle of the ferroelectric liquid crystal panel standing up from a horizontal plane, the display user can adjust the disposition angle to a position not causing the negative-positive inversion.

In a particularly preferred embodiment of the embodiment shown in FIG. 2A, the region (I) is set as a region defined by an angle spanning from a direction rotated clockwise by an apparent tilt angle $\theta a$ to a direction rotated similarly clockwise by an angle of 45 degrees - $\theta a$, respectively, from the rubbing direction; the region (II) is similarly set as a region defined by an angle spanning from a direction rotated clockwise by the apparent tilt angle $\theta a$ to a direction rotated clockwise by the angle of 45 degrees - $\theta a$, respectively, from the direction perpendicular to the rubbing direction; and the transmission axes of the first and second polarizers form angles including a smaller angle $\theta_{AP}$ satisfying the relation of $45° < \theta_{AP} < 90°$, preferably $75° < \theta_{AP} < 90°$. By setting the intersection angle $\theta_{AP}$ to a value smaller than 90 degrees in this way, i.e., by arranging the polarizers in a non-right angle cross nicol state, the region of causing a negative-positive inversion is kept away to a sufficiently remote region forming a viewing angle of 50 degrees or larger from the opposite.

Figure 1A:
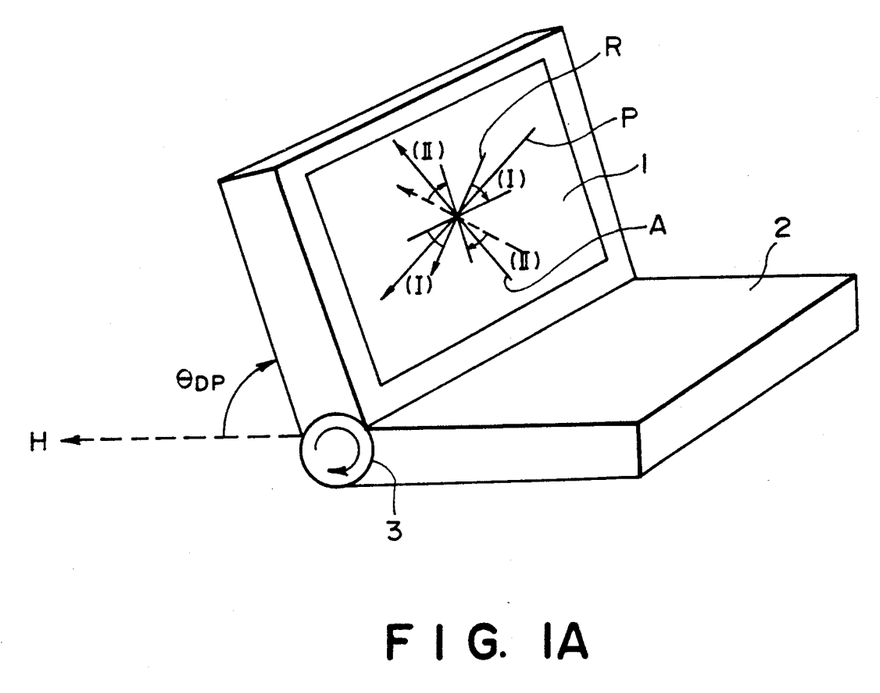
FIGS. 1A–1D are schematic perspective views of embodiments of the present invention.
Figure 3:
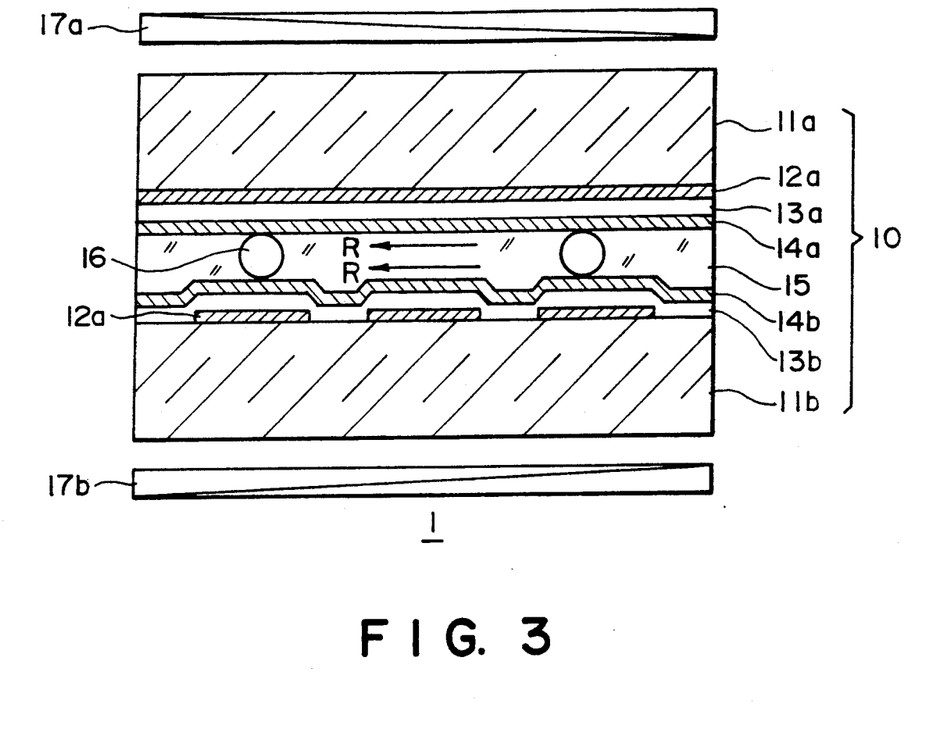
FIG. 3 is a sectional view of a liquid crystal pane as shown in FIGS. 1A–1D.

FIG. 1A shows an appearance of an embodiment of the ferroelectric liquid crystal display apparatus according to the present invention, and FIG. 3 is a sectional view of the liquid crystal panel contained therein.

Referring to FIG. 1A, the display apparatus includes a liquid crystal panel 1, a manipulator 2 such as a keyboard, and an angle adjusting mechanism 3 for adjusting the angle of disposition of the liquid crystal panel 1 including a ferroelectric liquid crystal cell 10 (FIG. 3) with respect to a horizontal plane. On the backside of the liquid crystal panel 1 is disposed a backlight (not shown) for illuminating the liquid crystal panel 1 from the backside. In the figure, R denotes the rubbing direction, P denotes the transmission axis of a first polarizer (17a in FIG. 3), A denotes the transmission axis of a second polarizer (17b in FIG. 3), H denotes a horizontal direction, and $\theta_{DP}$ denotes the disposition angle of the liquid crystal cell 10.

Figure 4:
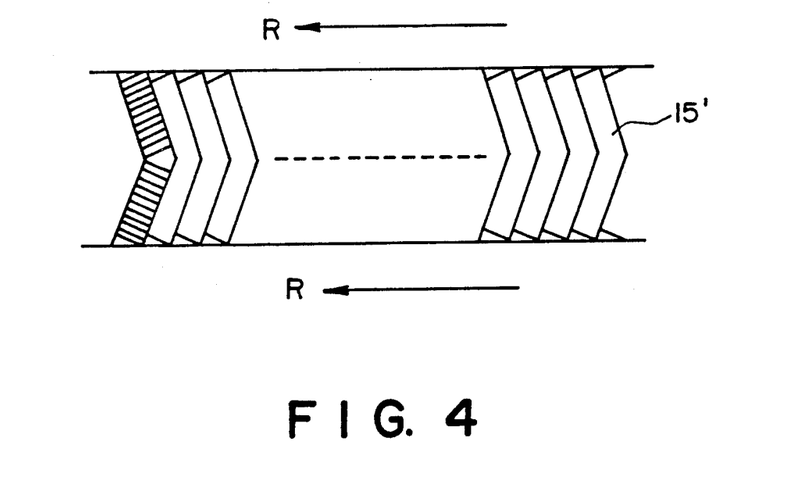
FIG. 4 is an illustration of a liquid crystal molecular layer structure as shown in a liquid crystal cell as shown in FIG. 3.

Referring to FIG. 3, the liquid crystal panel 1 includes a ferroelectric liquid crystal cell 10 comprising substrates 11a, 11b having thereon transparent electrodes 12a, 12b, insulating films 13a, 13b coating the transparent electrodes 12a, 12b, alignment films 14a, 14b formed on the insulating films 13a, 13b, a ferroelectric liquid crystal (FLC) 15, and spacer beads 16, a polarizer (polarizer on the backlight side) 17a, and an analyzer (polarizer on the display side) 17b. As shown, the liquid crystal panel 1 is composed by disposing the ferroelectric liquid crystal cell 10 which in turn is constituted by sandwiching the ferroelectric liquid crystal 15 between the pair of the substrates 17a and 17b respectively having the electrodes 12a, 12b and the alignment films 14a, 14b, between the pair of polarizers 17a, 17b. R denotes the directions of rubbing applied respectively to the alignment films 14a and 14b on the substrates 11a and 11b. By rubbing the alignment films 14a and 14b in parallel directions, ferroelectric liquid crystal molecules constituting liquid crystal molecule layers 15' are aligned in the rubbing direction to form a chevron splay structure as illustrated in FIG. 4.

Figure 5:
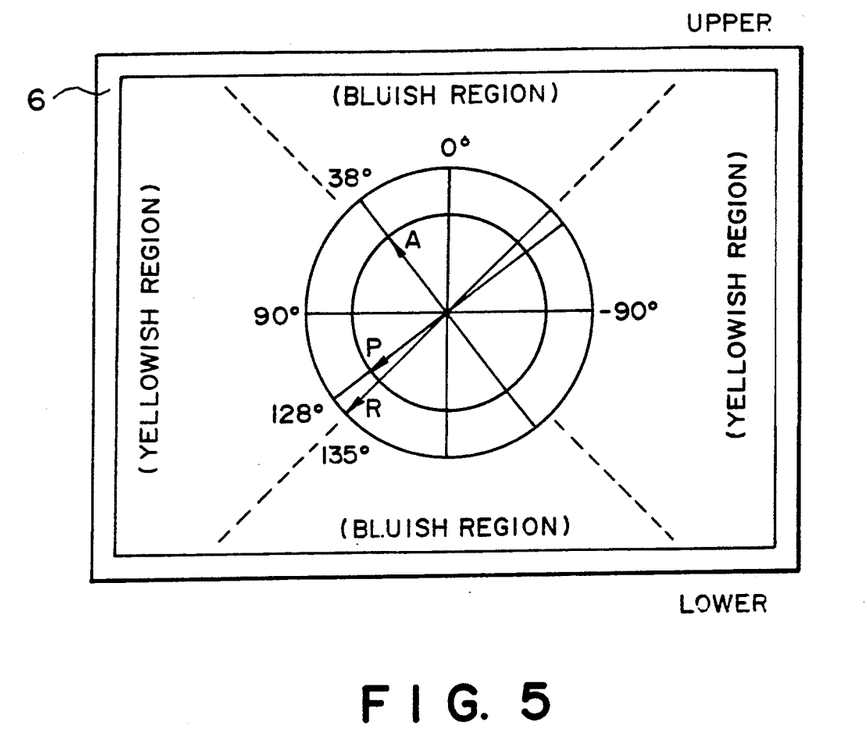
FIG. 5 is an explanatory view for illustrating regions (I) and (II) in relation to the rubbing direction in the display apparatus shown in FIG. 1A.

In a particular embodiment, the alignment films 14a and 14b of the liquid crystal panel 1 in FIG. 1A were rubbed in parallel with each other in the same oblique direction forming an angle of 45 degrees with respect to the vertical direction and extending from upper right to lower left of a panel frame 6 shown in FIGS. 1, 2 and 5. In this instance, the liquid crystal material used was a pyrimidine-type liquid crystal mixture and showed an apparent tilt anglel θa of 7 degrees. The apparent tilt angle θa used herein refers to a half of an angle formed between an average molecular axis direction $\theta_{PO}$ resultant after application of a positive polarity pulse to the liquid crystal and subsequent removal of the pulse and an average molecular axis direction $\theta_{NO}$ resultant after application of a negative polarity pulse to the liquid crystal and subsequent removal of the pulse. Thus, $\theta a = (\theta_{PO} - \theta_{NO})/2$.

In lhe particular embodiment, the transmission axis direction P of the polarizer 17a was set at a clockwise angle of 7 degrees from the rubbing direction R, and the transmission axis direction A of the analyzer 17b was set at a clockwise angle of 7 degrees from the direction perpendicular to the rubbing direction.

Figure 6:
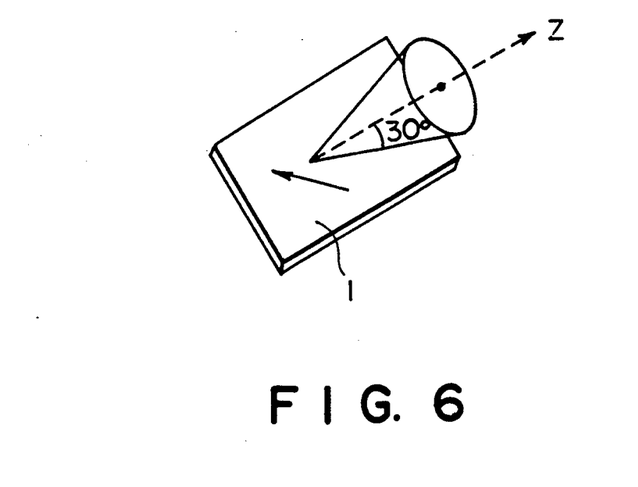
FIG. 6 is a schematic view for explaining the manner of observation of tint of a liquid crystal panel.

According to this embodiment, due to the oblique rubbing, a region or boundary where the white display state abruptly changed from a yellowish white to a bluish white at a viewing angle of about 30 degrees from the opposite was deviated to the oblique direction, so that the color irregularity accompanying head shaking was suppressed. The tints indicated in the parentheses in FIG. 5 roughly express the tints of the white states of the respective regions of the panel 1 when the panel 1 was observed from a conical region defined by an angle of 30 degrees or less from the normal Z to the center of the panel as shown in FIG. 6.

In this particular embodiment shown in FIG. 2A, by setting the transmission axes of the polarizers to directions of angles rotated clockwise from the oblique rubbing direction extending upper right to lower left, the white display state was controlled so that its bluish white tint always faced the display user regardless of the positivity or negativity of spontaneous polarization $P_S$ or the directions of twist of FLC molecules at the upper and lower substrate boundaries.

Because of the above control, a negative-positive inversion region was removed accompanying changes in horizontal viewing angle.

On the other hand, due to the above viewing angle control, a negative-positive inversion region occurred at angles of 45 degrees or larger from the opposite in the vertical direction to cause a lowering in display quality. However, this problem could be solved by adjustment of the disposition angle of the ferroelectric liquid crystal panel 1 from a horizontal plane by using the mechanism 3 shown in FIG. 1.

Figure 7:
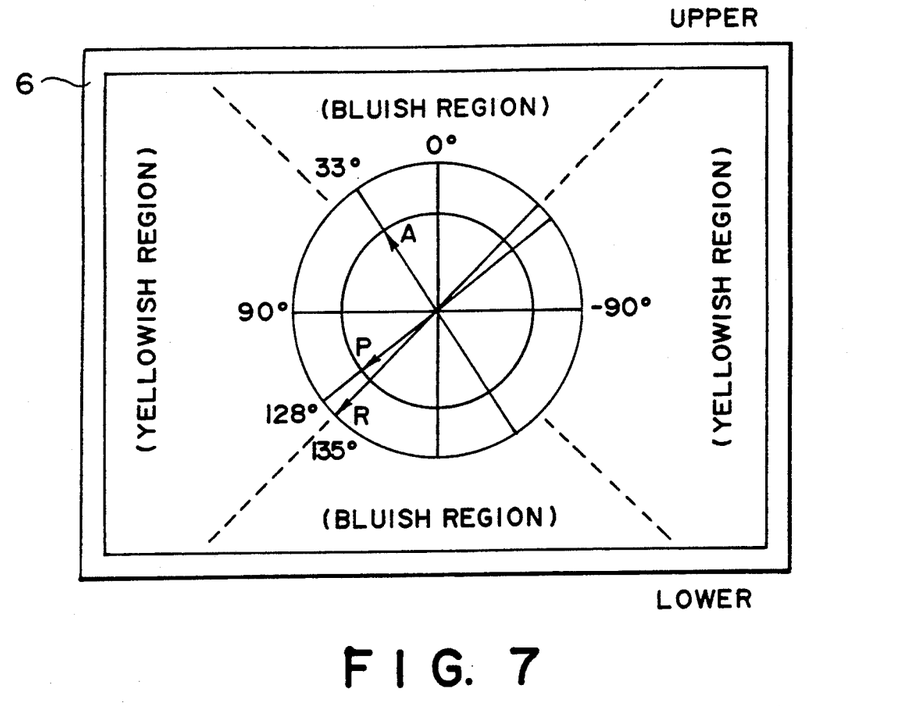
FIG. 7 is an explanatory view for illustrating regions (I) and (II) in relation to the rubbing direction in another embodiment of the display apparatus shown in FIG. 1A.

FIG. 7 shows another specific embodiment of the embodiment shown in FIG. 2A.

In this specific embodiment, compared with the embodiment shown above, the transmission axis A of the analyzer 17b was set at an angle of 12 degrees which was larger than the apparent tilt angle θa (=7 degrees) from the direction perpendicular to the rubbing direction R, so that the polarizer 17a and the analyzer 17b formed non-right angle cross nicols.

Thus, the smaller angle of intersection $\theta_{AP}$ between polarizer transmission axis P and the analyzer transmission axis A was set at 85 degrees to provide non-right angle cross nicols giving brighter states with respect to both display states. As a result, the negative-positive inversion region or boundary in the vertical direction could be increased from a viewing angle of about 50 degrees to about 70 degrees respectively from the opposite.

In an embodiment shown in FIG. 2B, the transmission axis of a first polarizer is set within the region (I) defined by a counterclockwise angle of 0–45 degrees from the oblique rubbing direction R, and the transmission axis of a second polarizer is set within a region (II) defined by a counterclockwise angle of 0–45 degrees from the direction intersecting perpendicularly to the oblique rubbing direction. As a result, the white display state is so controlled that the display user always faces a yellowish white and the contrast in a region defined by a horizontal viewing angle of ± about 30 degrees from the opposite which is important to the display user can be set to a uniformly high value.

By setting the rubbing direction and the transmission axis directions of the polarizers in the above-described manner, there arises a problem that the contrast remarkably decreases from its maximum in the vicinity of the opposite according to a change in viewing angle in the vertical direction. However, as the apparatus is constructed so as to allow adjustment of the disposition angle of the ferroelectric liquid crystal panel standing up from a horizontal plane, the display user can adjust the disposition angle to a position not causing a remarkable contrast change.

Further, by setting the rubbing direction and the transmission axes of the polarizers in the above-described manner, there arises a problem that a socalled negative-positive inversion region occurs at a horizontal viewing angle of 45 degrees or larger. However, by setting an intersection angle $\theta_{AP}$ of the transmission axes of the two polarizer at an angle smaller than 90 degrees, i.e., by arranging the two polarizers in a non-right angle cross nicol state, the negative-positive inversion is kept sufficiently away from the opposite, i.e., to a position giving a viewing angle of 50 degrees or larger.

Thus, in a particularly preferred embodiment of the embodiment shown in FIG. 2B, the region (I) is set as a region defined by an angle spanning from a direction rotated counterclockwise by an apparent tilt angle θa to a direction rotated similarly counterclockwise by an angle of 45 degrees - θa, respectively, from the rubbing direction R; the region (II) is similarly set as a region defined by an angle spanning from a direction rotated counterclockwise by the apparent tilt angle θa to a direction rotated counterclockwise by the angle of 45 degrees - θa, respectively, from the direction $R_N$ perpendicular to the rubbing direction; and the transmission axes of the first and second polarizers form angles including a smaller angle $\theta_{AP}$ satisfying the relation of $45° < \theta_{AP} < 90°$, preferably $75° < \theta_{AP} < 90°$.

Figure 1B:
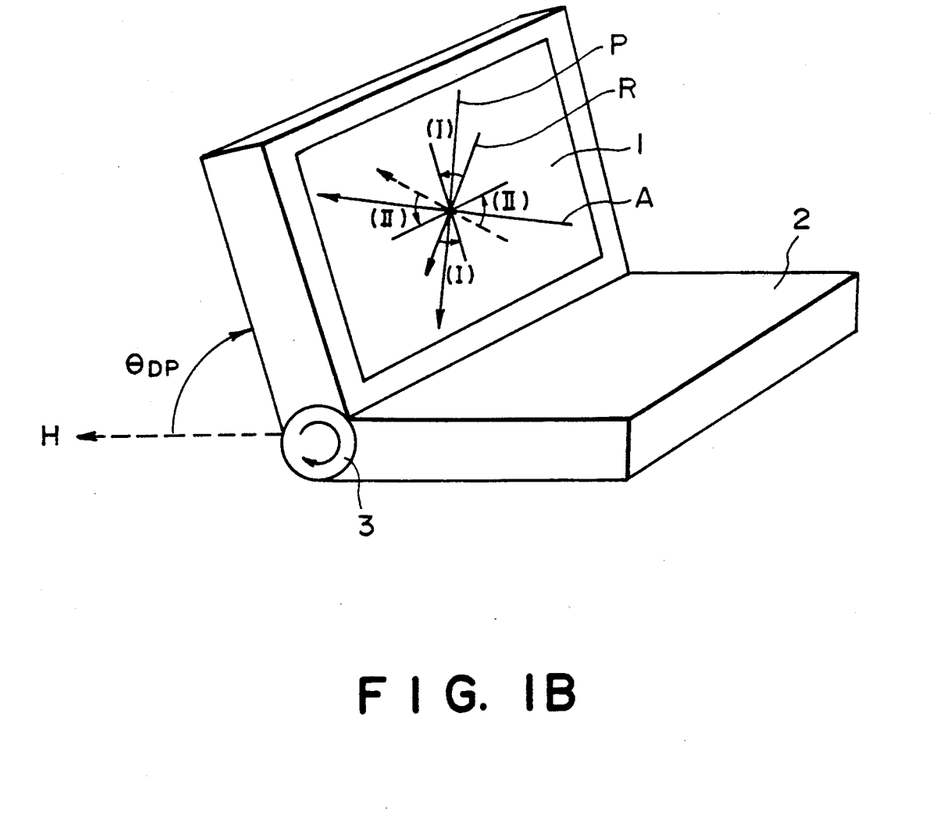

FIG. 1B shows an appearance of an embodiment of the ferroelectric liquid crystal display apparatus according to the present invention. The embodiment has entirely the same structure as the one explained with reference to FIG. 1A except that the liquid crystal panel shown in FIG. 2B is used instead of the one shown in FIG. 2A.

According to this embodiment, due to the oblique rubbing, a region or boundary where the white display state abruptly changed from a yellowish white to a bluish white at a viewing angle of about 30 degrees from the opposite was deviated to the oblique direction, so that the color irregularity accompanying head shaking was suppressed. The tints indicated in the parentheses in FIG. 8 roughly express the tints of the white states of the respective regions of the panel 1 when the panel 1 was observed from a conical region defined by an angle of 30 degrees or less from the normal Z to the center of the panel as shown in FIG. 6.

In this particular embodiment shown in FIG. 2B, by setting the transmission axes of the polarizers to directions of angles rotated counterclockwise from the oblique rubbing direction extending upper right to lower left, the white display state was controlled so that its yellowish white tint always faced the display user regardless of the positivity or negativity of spontaneous polarization $P_S$ or the directions of twist of FLC molecules having a chevron splay structure at the upper and lower substrate boundaries.

Because of the above control, the contrast in a horizontal viewing angle region of ± about 30 degrees from the opposite was set to a uniformly high value.

On the other hand, due to the above viewing angle control, a problem arises that the contrast remarkably decreased from its maximum in the vicinity of the opposite according to a change in viewing angle in the vertical direction. However, this problem could be solved by adjustment of the disposition angle of the ferroelectric liquid crystal panel 1 from a horizontal plane by using the mechanism 3 shown in FIG. 1 to select a position not causing a remarkable contrast change.

Further, accompanying the above viewing angle control, the negative-positive inversion occurred at a horizontal viewing angle of 45 degrees or large. In this embodiment, however, the smaller angle of intersection $\theta_{AP}$ between polarizer transmission axis P and the analyzer transmission axis A was set at 85 degrees to provide non-right angle cross nicols giving brighter states with respect to both display states. As a result, the negative-positive inversion region or boundary in the horizontal direction could be increased from a viewing angle of about 50 degrees to about 70 degrees respectively from the opposite.

Figure 8:
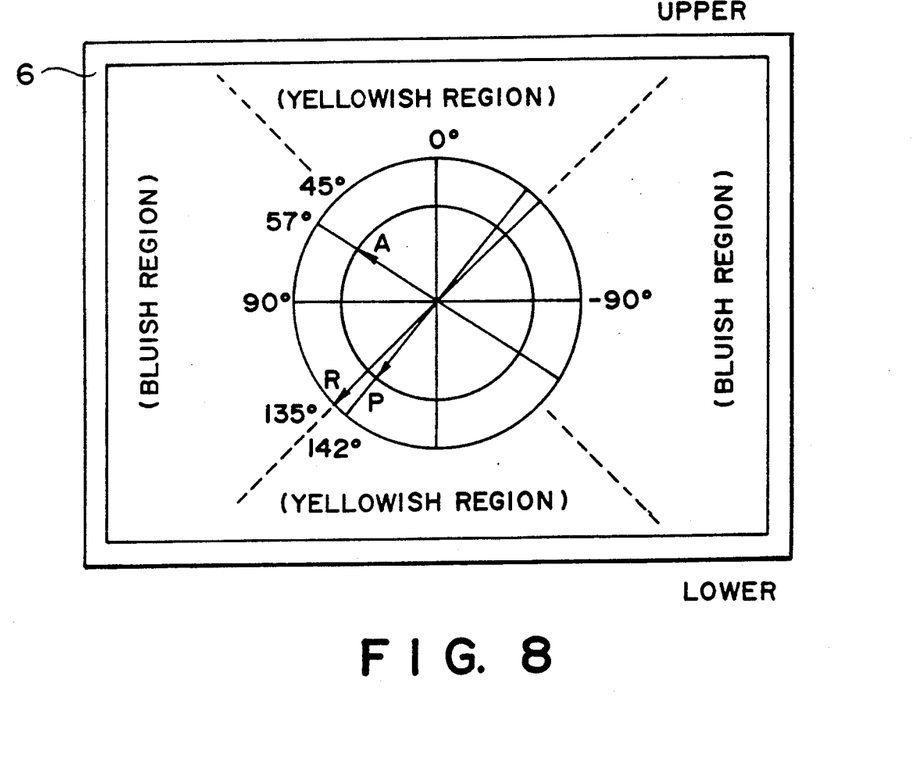
FIG. 8 is an explanatory view for illustrating regions (I) and (II) in relation to the rubbing direction in the display apparatus shown in FIG. 1B.

More specifically, in this particular embodiment, the alignment films 14a and 14b of the liquid crystal panel 1 in FIG. 1B were rubbed in parallel with each other in the same oblique direction forming an angle of 45 degrees with respect to the vertical direction and extending from upper right to lower left of a panel frame 6 shown in FIGS. 1, 2 and 8. In this instance, the liquid crystal material used was a pyrimidine-type liquid crystal mixture and showed an apparent tilt angle $\theta a$ of 7 degrees.

In the particular embodiment, the transmission axis direction P of the polarizer 17a was set at a counterclockwise angle of 7 degrees from the rubbing direction R, and the transmission axis direction A of the analyzer 17b was set at a counterclockwise angle of 12 degrees from the direction perpendicular to the rubbing direction.

Figure 2C:
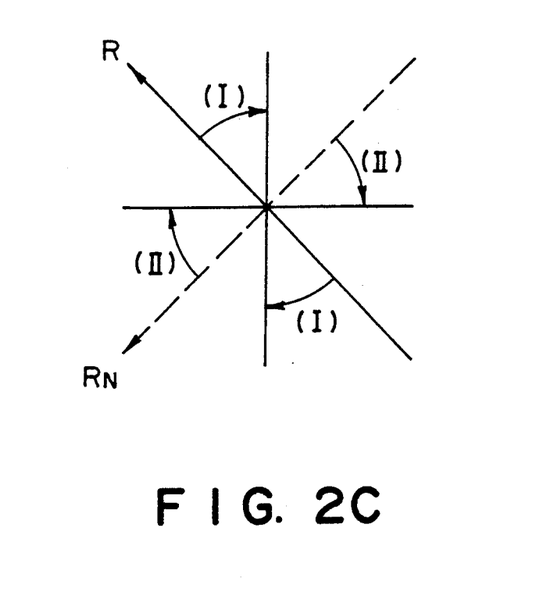
Figure 2D:
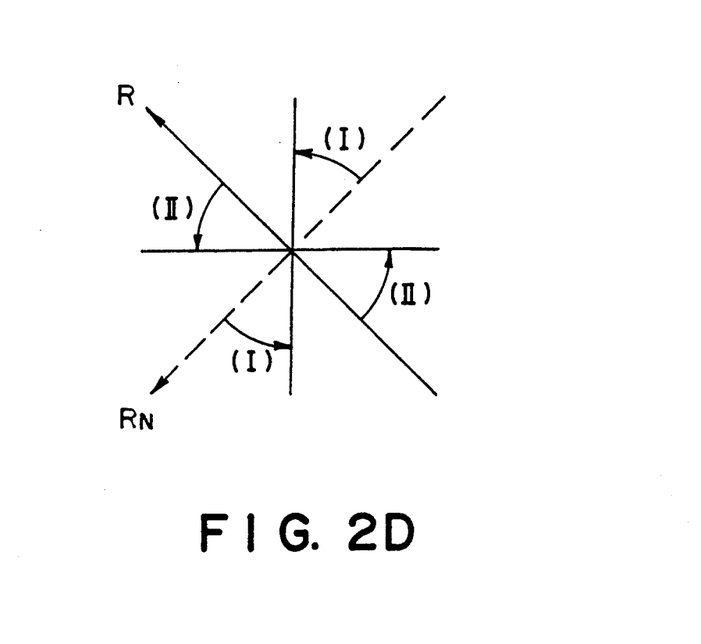

FIGS. 2C and 2D each show a relationship between regions (I) and (II) and a rubbing direction in case where a pair of substrates have alignment films provided with rubbing axes which are parallel with each other and in the same oblique direction extending from lower right to upper left (or upper left to lower right). FIG. 2C shows an embodiment wherein the region (I) is set as a region defined by a clockwise angle of 45 degrees from the rubbing direction R, and FIG. 2D shows an embodiment wherein the region (I) is set as a region defined by a counterclockwise angle of 45 degrees from the rubbing direction R.

According to the embodiment shown in FIG. 2C, the rubbing is applied in an oblique direction of from lower right to upper left or from upper left to lower right. As a result, in a viewing angle region of about 30 degrees from the panel opposite, a region where a white display state abruptly changes from a yellowish white to a bluish white is deviated to the oblique direction, whereby the color irregularity accompanying head shaking is suppressed.

Further, in the embodiment shown in FIG. 2C, the transmission axis of a first polarizer is set within the region (I) defined by a clockwise angle of 0-45 degrees from the oblique rubbing direction R, and the transmission axis of a second polarizer is set within a region (II) defined by a clockwise angle of 0-45 degrees from the direction $R_N$ intersecting perpendicularly to the oblique rubbing direction. As a result, the white display state is so controlled that the display user always faces a yellowish white and the contrast a region defined by a horizontal viewing angle of ± about 30 degrees from the opposite which is important to the display user can be set to a uniformly high value.

By setting the rubbing direction and the transmission axis directions of the polarizers in the above-described manner, there arises a problem that the contrast remarkably decreases from its maximum according to a change in viewing angle in the vertical direction. However, as the apparatus is constructed so as to allow adjustment of the disposition angle of the ferroelectric liquid crystal panel standing up from a horizontal plane, the display user can adjust the disposition angle to a position not causing a remarkable contrast change.

Further, by setting the rubbing direction and the transmission axes of the polarizers in the above-described manner, there arises a problem that a so-called negative-positive inversion region occurs at a horizontal viewing angle of 45 degrees or larger. However, by setting an intersection angle $\theta_{AP}$ of the transmission axes of the two polarizer at an angle smaller than 90 degrees, i.e., by arranging the two polarizers in ia non-right angle cross nicol state, the negative-positive inversion is kept sufficiently away from the opposite, i.e., to a position giving a viewing angle of 50 degrees or larger.

Thus, in a particularly preferred embodiment of the embodiment shown in FIG. 2C, the region (I) is set as a region defined by an angle spanning from a direction rotated clockwise by an apparent tilt angle $\theta a$ to a direction rotated similarly clockwise by an angle of 45 degrees - $\theta a$, respectively, from the rubbing direction; the region (II) is similarly set as a region defined by an angle spanning from a direction rotated clockwise by the apparent tilt angle $\theta a$ to a direction rotated clockwise by the angle of 45 degrees - $\theta a$, respectively, from the direction perpendicular to the rubbing direction; and the transmission axes of the first and second polarizers from angles including a smaller angle $\theta_{AP}$ satisfying the relation of $45° < \theta_{AP} < 90°$, preferably $75° < \theta_{AP} < 90°$.

Figure 1C:
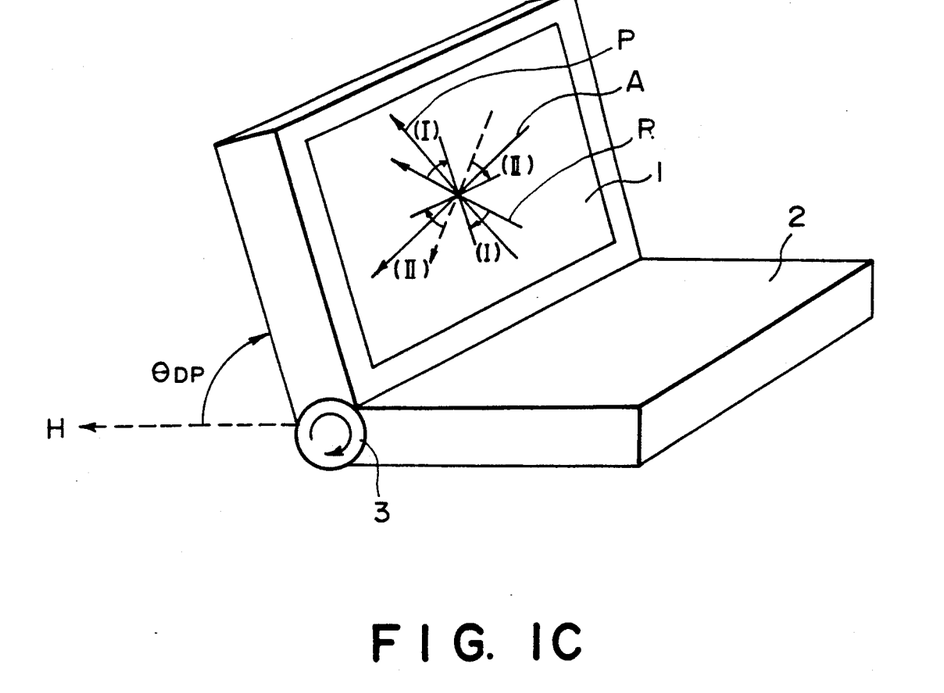

FIG. 1C shows an appearance of an embodiment of the ferroelectric liquid crystal display apparatus according to the present invention. The embodiment has entirely the same structure as the one explained with reference to FIG. 1A except that the liquid crystal panel shown in FIG. 2C is used instead of the one shown in FIG. 2A.

Figure 9:
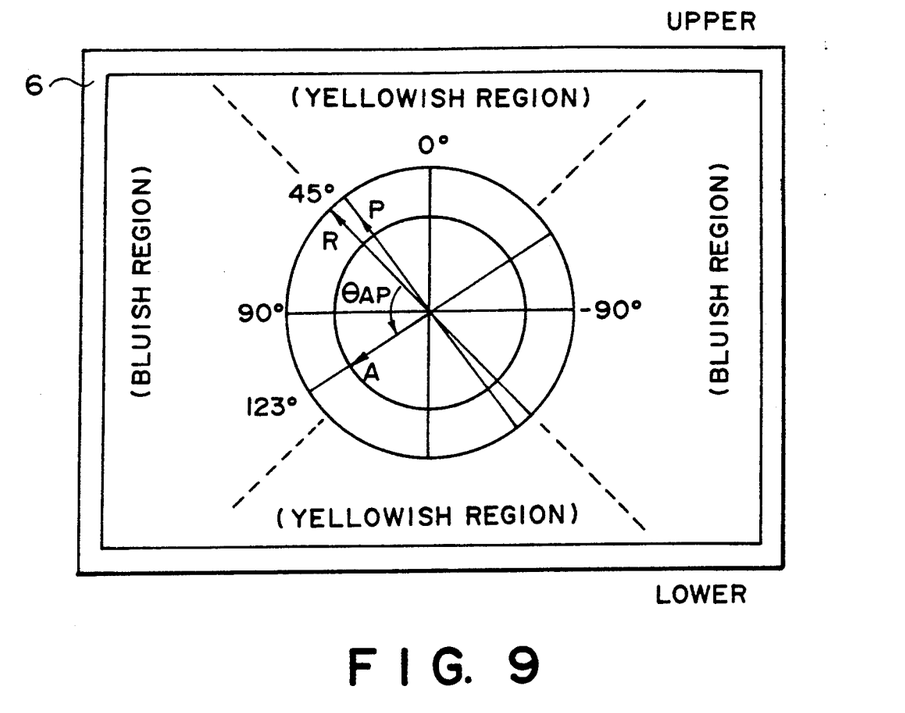
FIG. 9 is an explanatory view for illustrating regions (I) and (II) in relation to the rubbing direction in the display apparatus shown in FIG. 1C.

In a particular embodiment, the alignment films 14a and 14b of the liquid crystal panel 1 in FIG. 1C were rubbed in parallel with each other in the same oblique direction forming an angle of 45 degrees with respect to the vertical direction and extending from lower right to upper left of a panel frame 6 shown in FIGS. 1C, 2C and 9. In this instance, the liquid crystal material used was a pyrimidine-type liquid crystal mixture and showed an apparent tilt angle $\theta a$ of 7 degrees.

In the particular embodiment, the transmission clockwise angle of 7 degrees from the rubbing direction R, and the transmission axis direction A of the analyzer 17b was set at a clockwise angle of 7 degrees from the direction perpendicular to the rubbing direction.

According to this embodiment, due to the oblique rubbing, a region or boundary where the white display state abruptly changed from a yellowish white to a bluish white at a viewing angle of about 30 degrees from the opposite was deviated to the oblique direction, so that the color irregularity accompanying head shaking was suppressed. The tints indicated in the parentheses in FIG. 9 roughly express the tints of the white states of the respective regions of the panel 1 when the panel 1 was observed from a conical region defined by an angle of 30 degrees or less from the normal Z to the center of the panel as shown in FIG. 6.

In this particular embodiment according to FIG. 2C, by setting the transmission axes of the polarizers to directions of angles rotated clockwise from the oblique rubbing direction extending lower right to upper left, the white display state was controlled so that its yellowish white tint always faced the display user regardless of the positivity or negativity of spontaneous polarization $P_S$ or the directions of twist FLC molecules having a chevron splay structure at the upper and lower substrate boundaries.

Because of the above control, first of all, the contrast in a horizontal viewing region of ± about 30 degrees from the opposite was set to a uniformly high value.

On the other hand, due to the above viewing angle control, a problem arises that the contrast remarkably decreased from its maximum in the vicinity of the opposite according to a change in viewing angle in the vertical direction. However, this problem could be solved by adjustment of the disposition angle of the ferroelectric liquid crystal panel 1 from a horizontal plane by using the mechanism 3 shown in FIG. 1 to select a position not causing a remarkable contrast change.

Further, accompanying the above viewing angle control, the negative-positive inversion occurred at a horizontal viewing angle of 45 degrees or larger. In this embodiment, however, the smaller angle of intersection $\theta_{AP}$ between polarizer transmission axis P and the analyzer transmission axis A was set at 85 degrees to provide non-right angle cross nicols giving brighter states with respect to both display states. As a result, the negative-positive inversion region or boundary in the horizontal direction could be increased from a viewing angle of about 50 degrees to about 70 degrees respectively from the opposite.

According to the embodiment shown in FIG. 2D, the rubbing is applied in an oblique direction of from lower right to upper left or from upper left to lower right. As a result, in a viewing angle region of about 30 degrees from the panel opposite, a region where a white display state abruptly changes from a yellowish white to a bluish white is deviated to the oblique direction, whereby the color irregularity accompanying head shaking is suppressed.

Further, in the embodiment shown in FIG. 2A, the transmission axis of a first polarizer is set within the region (I) defined by a counterclockwise angle of 0–45 degrees from the oblique rubbing direction R, and the transmission axis of a second polarizer is set within a region (II) defined by a counterclockwise angle of 0–45 degrees from the direction intersecting perpendicularly to the oblique rubbing direction. As a result, the white display state is so controlled that the display user always faces a bluish white and the occurrence of a negative-positive inversion region is prevented with respect to a horizontal viewing angle characteristic.

By setting the rubbing direction and the transmission axis directions of the polarizers in the above-described manner, a problem of a negative-positive inversion of an exchange between black and white states occurs according to a change in viewing angle in the vertical direction. However, as the apparatus is constructed so as to allow adjustment of the disposition angle of the ferroelectric liquid crystal panel standing up from a horizontal plane, the display user can adjust the disposition angle to a position not causing the negative-positive inversion.

In a particularly preferred embodiment of the embodiment shown in FIG. 2D, the region (I) is set as a region defined by an angle spanning from a direction rotated counterclockwise by an apparent tilt angle $\theta a$ to a direction rotated similarly counterclockwise by an angle of 45 degrees - $\theta a$, respectively, from the rubbing direction; the region (II) is similarly set as a region defined by an angle spanning from a direction rotated counterclockwise by the apparent tilt angle $\theta a$ to a direction rotated counterclockwise by the angle of 45 degrees - $\theta a$, respectively, from the direction perpendicular to the rubbing direction; and the transmission axes of the first and second polarizers form angles including a smaller angle $\theta_{AP}$ satisfying the relation of $45° < \theta_{AP} < 90°$, preferably $75° < \theta_{AP} < 90°$. As a result, the region of causing a negative-positive inversion is kept away to a sufficiently remote region forming a viewing angle of 50 degrees or larger from the opposite.

Figure 1D:
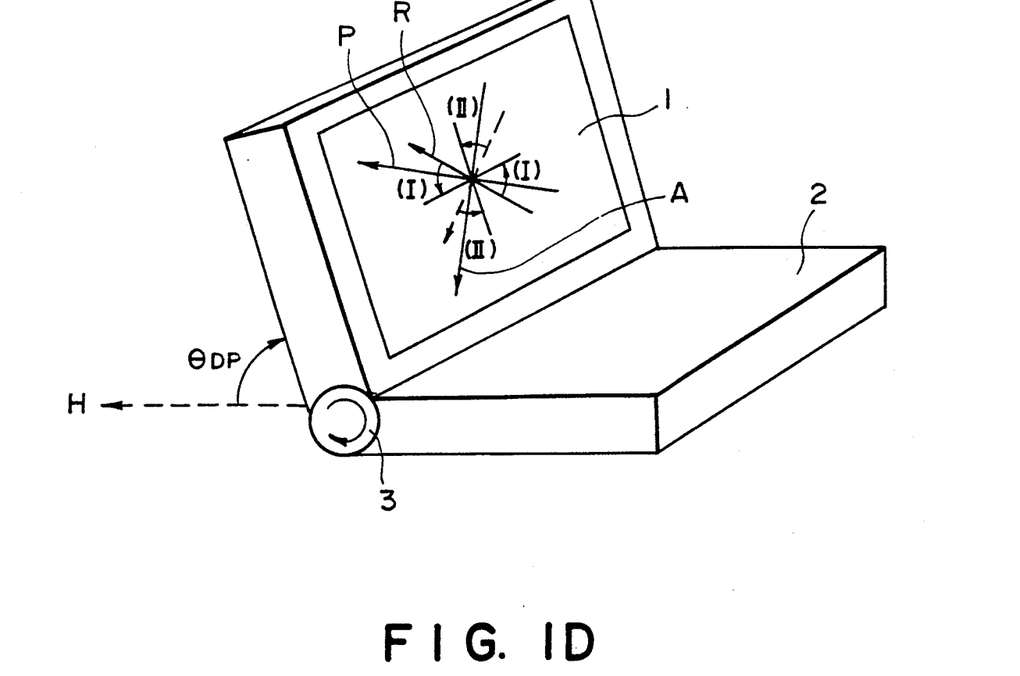

FIG. 1D shows an appearance of an embodiment of the ferroelectric liquid crystal display apparatus according to the present invention. The embodiment has entirely the same structure as the one explained with reference to FIG. 1A except that the liquid crystal panel shown in FIG. 2D is used instead of the one shown in FIG. 2A.

Figure 10:
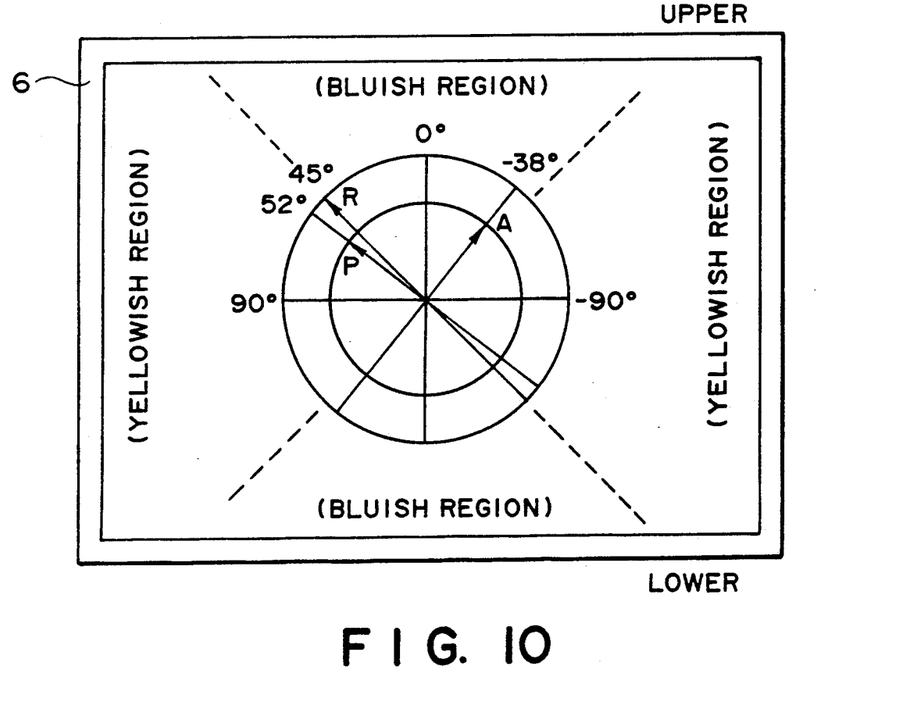
FIG. 10 is an explanatory view for illustrating regions (I) and (II) in relation to the rubbing direction in the display apparatus shown in FIG. 1D.

In a particular embodiment, the alignment films 14a and 14b of the liquid crystal panel 1 in FIG. 1D were rubbed in parallel with each other in the same oblique direction forming an angle of 45 degrees with respect to the vertical direction and extending from lower right to upper left of a panel frame 6 shown in FIGS. 1D, 2D and 10. In this instance, the liquid crystal material used was a pyrimidine-type liquid crystal mixture and showed an apparent tilt angle $\theta a$ of 7 degrees.

In the particular embodiment, the transmission axis direction P of the polarizer 17a was set at a counterclockwise angle of 7 degrees from the rubbing direction R, and the transmission axis direction A of the analyzer 17b was set at a counterclockwise angle of 7 degrees from the direction perpendicular to the rubbing direction.

According to this embodiment, due to the oblique rubbing, a region or boundary where the white display state abruptly changed from a yellowish white to a bluish white at a viewing angle of about 30 degrees from the opposite was deviated to the oblique direction, so that the color irregularity accompanying head shaking was suppressed. The tints indicated in the parentheses in FIG. 10 roughly express the tints of the white states of the respective regions of the panel 1 when the panel 1 was observed from a conical region defined by an angle of 30 degrees or less from the normal Z to the center of the panel as shown in FIG. 6.

In this particular embodiment shown in FIG. 2D, by setting the transmission axes of the polarizers to directions of angles rotated counterclockwise from the oblique rubbing direction extending lower right to upper left, the white display state was controlled so that its bluish white tint always faced the display user regardless of the positivity or negativity of spontaneous polarization $P_S$ or the directions of twist of FLC molecules having a chevron splay structure at the upper and lower substrate boundaries.

Because of the above control, a negative-positive inversion region was removed accompanying changes in horizontal viewing angle.

On the other hand, due to the above viewing angle control, a negative-positive inversion region occurred at angles of 45 degrees or larger from the opposite in the vertical direction to cause a lowering in display quality. However, this problem could be solved by adjustment of the disposition angle of the ferroelectric liquid crystal panel 1 from a horizontal plane by using the mechanism 3 shown in FIG. 1D.

Figure 11:
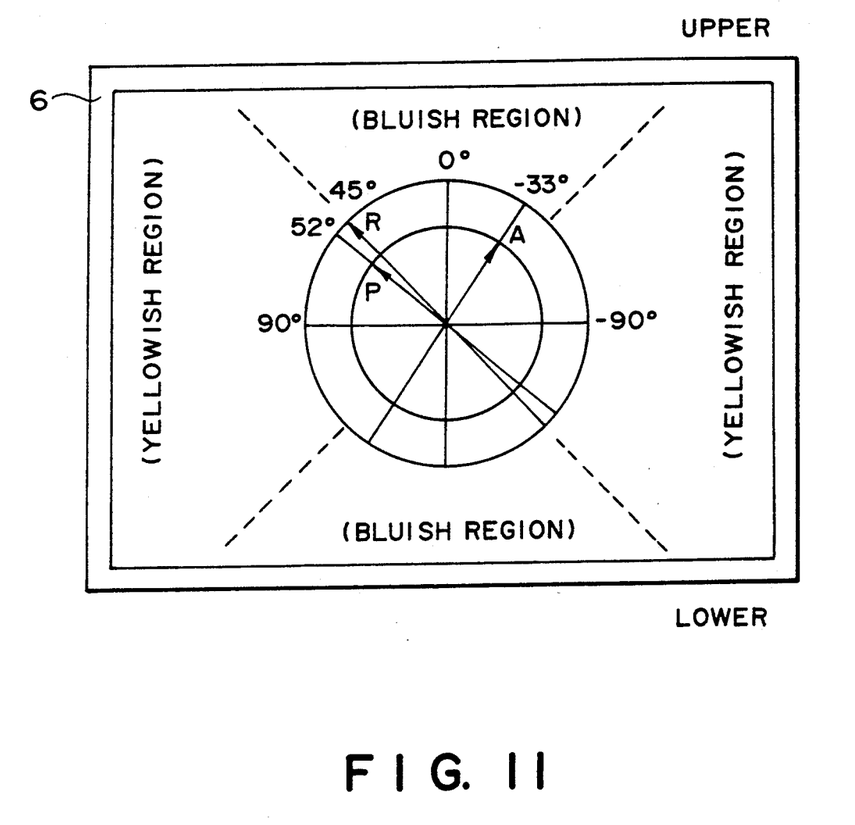
FIG. 11 is an explanatory view for illustrating regions (I) and (II) in relation to the rubbing direction in another embodiment of the display apparatus shown in FIG. 1D.

FIG. 11 shows another specific embodiment of the embodiment shown in FIG. 2D.

In this specific embodiment, compared with the embodiment shown above, the transmission axis A of the analyzer 17b was set at an angle of 12 degrees which was larger than the apparent tilt angle $\theta a$ (=7 degrees) from the direction perpendicular to the rubbing direction R, so that the polarizer 17a and the analyzer 17b formed non-right angle cross nicols.

Thus, the smaller angle of intersection $\theta_{AP}$ between polarizer transmission axis P and the analyzer transmission axis A was set at 85 degrees to provide non-right angle cross nicols giving brighter states with respect to both display states. As a result, the negative-positive inversion region or boundary in the vertical direction could be increased from a viewing angle of about 50 degrees to about 70 degrees respectively from the opposite.

The present invention is not limited to the above-described embodiment but can be practiced by appropriately modifying the above embodiments. For example, with respect to the transmission axis directions of the polarizers, the polarizer 17a has been taken as a first polarizer and the analyzer 17b has been taken as a second polarizer in the above, whereas the analyzer 17b can constitute a first polarizer and the polarizer 17a can constitute a second polarizer. Further, the liquid crystal panel 1 can be used in a position obtained by 180 degrees rotation thereof in the above embodiments.

What is claimed is:

1. A ferroelectric liquid crystal apparatus, comprising:

a ferroelectric liquid crystal cell including a pair of substrates each having an electrode and an alignment film thereon, said alignment films being respectively provided with uniaxial oritentation axes which are provided in parallel and each extending in the same direction from upper right to lower left or from lower left to upper right with respect to a direction normal to said liquid crystal cell;

a first polarizer having a transmission axis set within a region (I) defined by a clockwise angle of 45° from the direction of the uniaxial orientation axes;

a second polarizer having a transmission axis set within a region (II) defined by a clockwise angle of 45° from the direction perpendicular to the direction of the uniaxial orientation axes; and a mechanism for adjusting an angle of the ferroelectric liquid crystal cell standing up from a horizontal plane.

2. An apparatus according to claim 1, wherein the region (I) is defined by an angle spanning from a direction rotated clockwise by an apparent tilt angle $\theta a$ to a direction rotated clockwise by an angle of 45°−$\theta a$, respectively from the direction of the uniaxial orientation axes; the region (II) is defined by an angle spanning from a direction rotated clockwise by the apparent tilt angle $\theta a$ to a direction rotated clockwise by the angle of 45°−$\theta a$, respectively, from the direction perpendicular to the direction of the uniaxial orientation axes; and the transmission axis of the first polarizer and the transmission axis of the second polarizer are disposed to form intersection angles including a smaller angle $\theta_{AP}$ satisfying the relationship of 45°<$\theta_{AP}$<90°.

3. An apparatus according to claim 2, wherein the smaller angle $\theta_{AP}$ between the transmission axes of the first and second polarizers satisfies the relationship of 75°<$\theta_{AP}$<90°.

4. An apparatus according to claim 1, wherein the uniaxial orientation axes are those formed by rubbing.

5. A ferroelectric liquid crystal apparatus, comprising:

a ferroelectric liquid crystal cell including a pair of substrates each having an electrode and an alignment film thereon, said alignment films being respectively provided with uniaxial orientation axes which are provided in parallel and each extending in the same direction from upper right to lower left or from lower left to opper right with respect to a direction normal to said liquid crystal cell;

a first polarizer having a transmission axis set within a region (I) defined by a counterclockwise angle of 45° from the direction of the uniaxial orientation axes;

a second polarizer having a transmission axis set within a region (I) defined by a counterclockwise angle of 45° from the direction perpendicular to the direction of the uniaxial orientation axes; and a mechanism for adjusting an angle of the ferroelectric liquid crystal cell standing up from a horizontal plane.

6. An apparatus according to claim 5, wherein the region (I) is defined by an angle spanning from a direction rotated clockwise by an apparent tilt angle $\theta a$ to a direction rotated clockwise by an angle of 45°−$\theta a$, respectively from the direction of the uniaxial orientation axes; the region (II) is defined by an angle spanning from a direction rotated counterclockwise by the apparent tilt angle $\theta a$ to a direction rotated counterclockwise by the angle of 45°−$\theta a$, respectively, from the direction perpendicular to the direction of the uniaxial orientation axes; and the transmission axis of the first polarizer and the transmission axis of the second polarizer are disposed to form intersection angles including a smaller angle $\theta_{AP}$ satisfying the relationship of 45°<$\theta_{AP}$<90°.

7. An apparatus according to claim 6, wherein the smaller angle $\theta_{AP}$ between the transmission axes of the first and second polarizers satisfies the relationship of 75°<$\theta_{AP}$<90°.

8. An apparatus according to claim 5, wherein the uniaxial orientation axes are those formed by rubbing.

9. A ferroelectric liquid crystal apparatus, comprising:
- a ferroelectric liquid crystal cell including a pair of substrates each having an electrode and an alignment film thereon, said alignment films being respectively provided with uniaxial orientation axes which are provided in parallel and each extending in the same direction from lower right to upper left or from upper left to lower right with respect to a direction normal to said liquid crystal cell;
- a first polarizer having a transmission axis set within a region (I) defined by a counterclockwise angle of 45° from the direction of the uniaxial orientation axes;
- a second polarizer having a transmission axis set within a region (I) defined by a counterclockwise angle of 45° from the direction perpendicular to the direction of the uniaxial orientation axes; and
- a mechanism for adjusting an angle of the ferroelectric liquid crystal cell standing up from a horizontal plane.

10. An apparatus according to claim 9, wherein the region (I) is defined by an angle spanning from a direction rotated counterclockwise by an apparent tilt angle $\theta a$ to a direction rotated counterclockwise by an angle of $45°-\theta a$, respectively from the direction of the uniaxial orientation axes; the region (II) is defined by an angle spanning from a direction rotated counterclockwise by the apparent tilt angle $\theta a$ to a direction rotated counterclockwise by the angle of $45°-\theta a$, respectively, from the direction perpendicular to the direction of the uniaxial orientation axes; and the transmission axis of the first polarizer and the transmission axis of the second polarizer are disposed to form intersection angles including a smaller angle $\theta_{AP}$ satisfying the relationship of $45°<\theta_{AP}<90°$.

11. An apparatus according to claim 10, wherein the smaller angle $\theta_{AP}$ between the transmission axes of the first and second polarizers satisfies the relationship of $75°<\theta_{AP}<90°$.

12. An apparatus according to claim 9, wherein the uniaxial orientation axes are those formed by rubbing.

13. A ferroelectric liquid crystal apparatus, comprising:
- a ferroelectric liquid crystal cell including a pair of substrates each having an electrode and an alignment film thereon, said alignment films being respectively provided with uniaxial orientation axes which are provided in parallel and each extending in the same direction from lower right to upper left or from upper left to lower right with respect to a direction normal to said liquid crystal cell;
- a first polarizer having a transmission axis set within a region (I) defined by a clockwise angle of 45° from the direction of the uniaxial orientation axes;
- a second polarizer having a transmission axis set within a region (I) defined by a clockwise angle of 45° from the direction perpendicular to the direction of the uniaxial orientation axes; and
- a mechanism for adjusting an angle of the ferroelectric liquid crystal cell standing up from a horizontal plane.

14. An apparatus according to claim 13, wherein the region (I) is defined by an angle spanning from a direction rotated clockwise by an apparent tilt angle $\theta a$ to a direction rotated clockwise by an angle of $45°-\theta a$, respectively from the direction of the uniaxial orientation axes; the region (II) is defined by an angle spanning from a direction rotated clockwise by the apparent tilt angle $\theta a$ to a direction rotated clockwise by the angle of $45°-\theta a$, respectively, from the direction perpendicular to the direction of the uniaxial orientation axes; and the transmission axis of the first polarizer and the transmission axis of the second polarizer are disposed to form intersection angles including a smaller angle $\theta_{AP}$ satisfying the relationship of $45°<\theta_{AP}<90°$.

15. An apparatus according to claim 14, wherein the smaller angle $\theta_{AP}$ between the tranmission axes of the first and second polarizers satisfies the relationship of $75°<\theta_{AP}<90°$.

16. An apparatus according to claim 13, wherein the uniaxial orientation axes are those formed by rubbing.

* * * * *

UNITED STATES PATENT AND TRADEMARK OFFICE
CERTIFICATE OF CORRECTION

PATENT NO. : 5,082,352
DATED : January 21, 1992
INVENTOR(S) : HIDEYUKI KAWAGISHI, ET AL.

It is certified that error appears in the above-identified patent and that said Letters Patent is hereby corrected as shown below:

ON THE TITLE PAGE

IN [56] REFERENCES CITED

Under U.S. PATENT DOCUMENTS, insert:

-- 4,883,344  1989  Okada et al.
        4,820,026  1989  Okada et al.
        4,563,059  1986  Clark et al.
        4,367,924  1983  Clark et al. --.

Under OTHER PUBLICATIONS, insert:

-- Clark and Lagerwall, Applied Physics Letters, Vol. 36, No. 11 (June 1, 1980), pp. 899-901. --.

SHEET 5 OF 9

FIG. 3, "12a" (on left side) should read --12b--.

COLUMN 9

Line 5, "transmission clock-" should read --transmission axis direction P of the polarizer 17a was set at a clock- --.

COLUMN 12

Line 36, "opper" should read --upper--.
   Line 43, "region (I)" should read --region (II)--.
   Line 51, "clockwise" should read --counterclockwise--.
   Line 52, "clockwise" should read --counterclockwise--.

UNITED STATES PATENT AND TRADEMARK OFFICE
CERTIFICATE OF CORRECTION

PATENT NO. : 5,082,352
DATED : January 21, 1992
INVENTOR(S) : HIDEYUKI KAWAGISHI, ET AL.

It is certified that error appears in the above-identified patent and that said Letters Patent is hereby corrected as shown below:

<u>COLUMN 13</u>

Line 17, "region (I)" should read --region (II)--.

<u>COLUMN 14</u>

Line 17, "region (I)" should read --region (II)--.

Signed and Sealed this

Twenty-ninth Day of June, 1993

Attest:

MICHAEL K. KIRK

*Attesting Officer*  Acting Commissioner of Patents and Trademarks